United States Patent [19]

Laurent

[11] 4,444,269

[45] Apr. 24, 1984

[54] ANIMAL HOOF COVER

[76] Inventor: Geoffrey J. Laurent, R.D. 1, Cambridge, New Zealand

[21] Appl. No.: 311,244

[22] Filed: Oct. 14, 1981

[30] Foreign Application Priority Data

Oct. 20, 1980 [NZ] New Zealand .............. 195295

[51] Int. Cl.³ .............................................. A01L 3/00
[52] U.S. Cl. ........................................ 168/1; 168/18; 36/111; 54/82
[58] Field of Search ............... 168/1, 2, 3, 4, 5, 17, 168/18, 19, 20, 22, DIG. 1; 54/82; 36/111

[56] References Cited

U.S. PATENT DOCUMENTS

| 800,652 | 10/1905 | Jordan et al. | 168/18 |
| 1,089,293 | 3/1914 | Twist | 168/22 |
| 1,743,504 | 1/1930 | Tripp | 168/22 |
| 3,703,209 | 11/1972 | Glass | 168/4 |
| 4,174,754 | 11/1979 | Glass | 168/18 |

FOREIGN PATENT DOCUMENTS

| 325676 | 9/1902 | France | 168/19 |
| 6941 | of 1906 | United Kingdom | 168/22 |

Primary Examiner—Gene Mancene
Assistant Examiner—Kris R. Schulze
Attorney, Agent, or Firm—Abelman, Frayne, Rezac & Schwab

[57] ABSTRACT

This invention relates to animal hoof covers characterized in that provided a base, a toe cap fixed to the base and first and second fastener support means having tabs extending to either side thereof to which tie means can be mounted for securing the hoof cover to an animals hoof.

4 Claims, 4 Drawing Figures

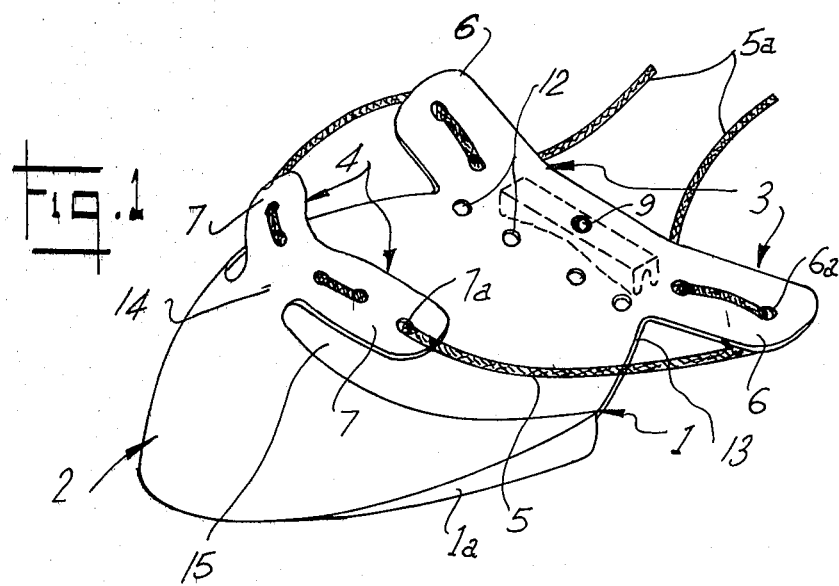

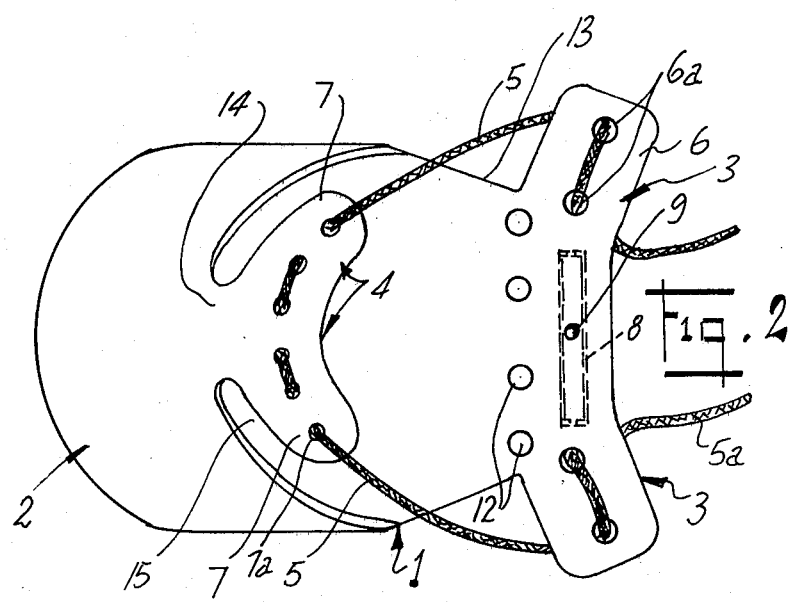
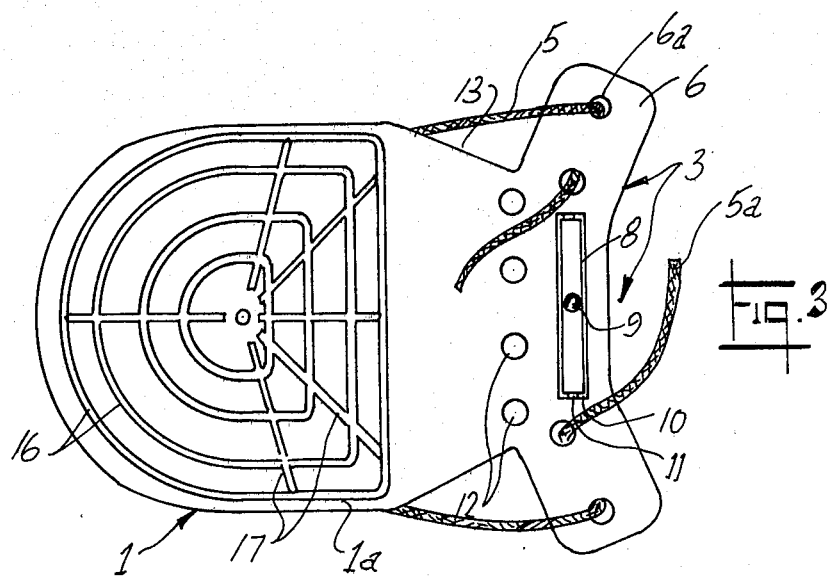

ANIMAL HOOF COVER

DESCRIPTION

This invention relates to animal hoof covers.

It is an object of the present invention to provide an animal hoof cover.

It is further object of the present invention to provide an animal hoof cover which can be conveniently fitted to the hoof of an animal, such as a cow or horse, which is useful for protection where a bandage or treatment has been applied to the animals hoof.

Further objects and advantages of the present invention will become apparent from the ensuing description. which is given by way of example only.

SUMMARY OF INVENTION

According to the present invention there is provided a hoof cover comprising a base, a toe cap fixed to and overlying a front portion of the base, a first fastener support means extending to the rear of the base and second fastener support means extending from the rear of the toe cap, said first and second fastener support means being adapted to mount tie means, the arrangement being such that the hoof cover can be secured to the hoof of an animal when the tie means are drawn and fastened.

According to a further aspect of the present invention the base, the toe cap, and the first and second fastener means are intergally formed from a resilient material.

BRIEF DESCRIPTION OF THE DRAWINGS

Aspects of the present invention will now be described by way of examples, with reference to the accompanying drawings of one possible embodiment thereof in which:

FIG. 1 is a perspective view of a hoof cover in accordance with one possible embodiment of the present invention, and FIG. 2 is a top view of the hoof cover of FIG. 1, and FIG. 3 is a view from below the hoof cover of FIG. 1, and FIG. 4 is a side view showing the hoof cover of FIGS. 1 to 3 attached to an animals' hoof.

DESCRIPTION OF THE INVENTION

With reference to the drawings a hoof cover in accordance with the present invention comprises a base generally indicated arrow 1, a toe cap generally indicated by arrow 2 fixed to overlying a front portion of the base 1, a first fastener support means generally indicated by arrow 3 extending from the rear of the base 1 and second fastener support means generally indicated by arrow 4 extending from the rear of the toe cap 2.

The first and second fastener support means 3 and 4 respectively are adapted to mount tie means such as a cord, the arrangement been such that the hoof cover can be secured to the hoof of an animal when the tie means 5 are drawn and fastened.

The hoof cover can be formed from a resilient material such plastics or rubber and the base 1, the toe cap 2, and the first and second fastener support means 3 and 4 can be integrally formed during moulding.

The first and second fastener support means 3 and 4 respectively can include tabs 6 and 7 which extend laterally to either side of the hoof cover and each of the tabs 6 and 7 may be provided with a plurality of apertures 6a, 7a to which the tie means 5 can be threaded for the purpose of fastening the hoof cover to the hoof of an animal.

The first fastener support means 3 can be provided with a clamp 8 fixed by a rivet 9 to the underside thereof said clamp 8 having end portions 10 each being provided with a slot 11 therein to which free ends of 5a of the tie means can be fixed prior to these being secured by a knot or bow.

A portion of the base 1 adjacent the first fastener support means 3 is provided with a plurality of vent holes 12 adjacent the second fastener support means, and the base 1 can, be tapered and of reduced cross-sectional area in a region 13 at the rear of the toe cap and proceeding the first fastener support means 3.

The second fastener means 4 can be joined to the toe cap 2 by a central joining piece 14 such that there exists a slotted opening 15 between the free ends of the tabs 7 and the toe cap 2.

The base 1 of the hoof cover is provided with a wedged shaped sole 1a formed by a plurality of spaced and continuous flanges 16 joined by a plurality of radially extending flanges 17.

FIG. 4 of the drawings illustrates the hoof cover attached to a hoof 18 of an animal. The hoof cover is secured on the hoof of an animal when the toe cap 2 is engaged therewith and the tie means 5 are drawn tight such that the second fastener support means follows the contour of the front portion 18a of the hoof 18. The first fastener support means can then be placed in position at the rear of the animals hoof below the fetlock 19 and the tie means 5 can then be pulled tight through the clamp with its free ends engaging in the slots 11 and then tied in a bow or knot with any surplus of the tie means been cut off.

With the hoof cover secured to an animals hoof and the animal having its leg placed on a ground surface below the hoof is inclined in a slightly unnatural forward position due to the wedge shaped base thus reducing strain on the tie means 5.

Aspects of the present invention have been described by way of example only as to be appreciated by modifications and additions to thereto may be provided without departing from the scope thereof.

I claim:

1. An animal hoof cover for use in covering an animal's hoof during veterinary treatments, said hoof cover comprising a base, a toe cap fixed to and overlying the base, said base having a sideless flat portion extending in a converging taper to a narrow end and away from the toe cap, first fastener support means comprising a first set of laterally extending tabs formed at the narrow end of the flat sideless portion, second fastener support means comprising a second set of laterally extending tabs joined to an upper curved edge of the toe cap by a central joining piece such that there exists a slotted opening between the second set of tabs and the curved edge of the toe cap, said first and second fastener support means being adapted to mount tie means, the arrangement and construction being such that the hoof cover can be secured to an animal's hoof when tie means fixed relative to the tabs of the first and second fastener support means are drawn and secured such that said sideless flat portion forms a rear hoof protecting portion protecting the rear of an animal's hoof and there exists an opening between the sideless flat portion, the toe cap and the first and second fastener support means where contact with tender regions of the animal's hoof is avoided.

2. A hoof cover as claimed in claim 1 molded in one piece in a resilient material such as plastics.

3. A hoof cover as claimed in claim 1 wherein the base provided with a wedge-shaped sole having its highest portion at the rear of the sole and toe cap.

4. A hoof cover as claimed in claim 3 including tie means comprising a continuous cord threaded in apertures in the tabs of the first and second fastener support means such that free fastener support means and the cord can be conveniently drawn and tied from the rear of the animals hoof.

* * * * *